United States Patent [19]

Koukovinis

[11] Patent Number: 4,580,251

[45] Date of Patent: Apr. 1, 1986

[54] ULTRASONIC DISTANCE SENSOR

[75] Inventor: Christos M. Koukovinis, Freeport, Ill.

[73] Assignee: Honeywell Inc., Minneapolis, Minn.

[21] Appl. No.: 550,326

[22] Filed: Nov. 9, 1983

[51] Int. Cl.⁴ .............................................. G01S 7/52
[52] U.S. Cl. .................................... 367/140; 181/400; 367/151
[58] Field of Search ................ 367/140, 151; 181/400; 310/335; 367/99

[56] References Cited

U.S. PATENT DOCUMENTS

| | | | |
|---|---|---|---|
| 2,448,399 | 8/1948 | Shaw | 73/67 |
| 2,459,162 | 1/1949 | Hayes | 367/151 |
| 2,467,301 | 4/1949 | Firestone | 73/617 |
| 2,510,947 | 6/1950 | Baker | 310/335 |
| 2,826,753 | 3/1958 | Chapin | 340/258 |
| 3,028,752 | 4/1962 | Bacon | 367/151 |
| 3,577,144 | 5/1971 | Girault | 343/14 |
| 3,690,007 | 6/1976 | Swensen | 73/67.8 |
| 3,690,154 | 9/1972 | Wells et al. | 73/67.9 |
| 3,902,357 | 9/1975 | Soldner et al. | 73/67.9 |
| 3,921,016 | 11/1975 | Livermore et al. | 310/335 |
| 4,412,315 | 10/1983 | Flournoy | 310/335 |
| 4,433,398 | 2/1984 | Kodera et al. | 181/400 X |
| 4,442,512 | 4/1984 | Kodera et al. | 181/400 X |

Primary Examiner—Richard A. Farley
Attorney, Agent, or Firm—Charles L. Rubow

[57] ABSTRACT

A single transducer ultrasonic distance sensor is disclosed which provides for range sensing down to zero distance from the sensor housing envelope with an electroacoustic transducer subject to unavoidable ringing following emission of a burst of acoustic energy. The housing is configured and the transducer mounted therein so that an acoustic path at least half as great as the distance travelled by an acoustic signal during the transducer ringing interval is provided within the housing envelope.

14 Claims, 3 Drawing Figures

ULTRASONIC DISTANCE SENSOR

The invention disclosed herein relates generally to ultrasonic sensors, and more specifically to single transducer ultrasonic sensors of the type which alternately emit and receive pulses of ultrasonic energy for object detection and distance measuring purposes There are at least two general techniques for ultrasonically measuring distance to an object. One involves transmitting a continuous sinusoidal or sinusoidally modulated wave toward a target, and measuring the phase shift in the wave reflected back from the target. Transmission of ultrasonic energy and reception of reflections thereof can be accomplished with separate transmitting and receiving transducers. The phase shift which has occured during signal transit can be determined by phase comparison circuitry. Such a system is disclosed in U.S. Pat. No. 3,577,144 issued to P. Girault on May 4, 1971.

A two transducer continuous transmission system has certain disadvantages. Most obviously, two transducers are required, thus contributing to the cost and physical size of the system. Further, the transducer elements must be closely tuned to one another. The requirement for initially matching the transducer elements contributes to manufacturing cost and complexity. In addition, the transducer elements are subject to frequency drift, thus requiring means for at least periodically adjusting tuning circuits associated with one or both transducer elements. The tuning circuits and devices further contribute to the cost and complexity of such systems. The tuning process may also contribute to operational time lags, inaccuracies and other limitations.

The foregoing problems and limitations can be avoided in a system using a single transducer for both the transmission and reception of ultrasonic energy. Examples of such systems are shown in U.S. Pat. Nos. 2,826,753 issued to R. Chapin on Mar. 11, 1958 and 3,960,007 issued to E. Swenson on June 1, 1976. In such systems, a standing wave is set up between the transducer and target. An impedance mismatch, depending on the relative phases of the transmitted and reflected waves, occurs at the transducer and is reflected back into its drive circuitry. This results in variations in the drive voltage which can be used to indicate target range.

Continuous wave systems as previously described are capable of providing very good distance sensing accuracy at relatively short ranges and continuous sensing of distance. However, they require relatively high input power since the transmission is continuous, and operational range is relatively short. Attempts to increase range by increasing the input power result in increased heating and rapid deterioration of the transducer element(s). Finally, such systems are prone to distance measuring ambiguities, particularly where the target includes reflecting surfaces at varying distances from the transducer, resulting in multiple signal paths.

A second general technique is based on determining distance by the time interval between transmission of a pulse of acoustic energy and reception of a reflection of that pulse from the target. This can be accomplished either with separate transmitting and receiving transducers or with a single transducer which performs both functions. As in connection with two transducer continuous transmission sensors, the transducers must be relatively well matched. The second transducer again contributes to the cost, complexity and size of the sensor package.

Pulse transmission sensors are capable of providing only periodic range indications. This drawback can be reduced by increasing the frequency of measurement. However, as the frequency of measurement is increased, the relationship between the transmitted signals and corresponding reflections becomes progressively more difficult to determine. Nevertheless, ultrasonic distance sensors operating with periodic pulses are suitable for many distance measuring applications. They are also more suitable than continuous transmission sensor for operation at relatively large target ranges, and they consume less power.

As in continuous transmission sensors, at least some of the disadvantages of two transducer pulse transmission sensors are avoided in single transducer implementations. However, single transducer pulse transmission sensors are subject to certain significant limitations because of the effects of mechanical resonance or ringing of the transducer element after each emission of a burst of acoustic energy. The ringing dies down to an acceptable level after a known time interval. However, until such a level is reached, the transducer is not capable of reliably detecting incoming acoustic energy reflected from the target. This results in inability to measure distance at very short ranges from the transducer Such a limitation is unacceptable in many ultrasonic distance sensor applications. Further, it is desirable or required that a general purpose ultrasonic distance sensor be capable of distance measurements over the complete range from zero distance from the sensor housing out to the maximum range of the sensor.

The applicant has devised a single transducer pulse transmission ultrasonic sensor having a unique housing design and component arrangement which avoids limitations on short range measurement so as to permit measurement down to zero distance from the sensor housing.

SUMMARY OF THE INVENTION

The present invention basically comprises a housing which supports an electroacoustic transducer adapted to be driven by an electrical signal so that it alternately emits a burst of acoustic energy and converts the portion of the burst of acoustic energy reflected back from a remote target to a corresponding electrical signal. The housing, which defines a housing envelope, is configured so that acoustic energy emitted by the transducer traverses a distance at least half as great as that which it travels during the transducer ringing interval before leaving the housing envelope. The acoustic energy may be redirected to leave the housing envelope by means of a reflecting surface which may spaced from the radiating surface of the transducer by a distance substantially half as great as that which the acoustic energy travels during the transducer ringing interval. The reflecting surface may be either planar or non-planar, and may define a parabolic section whose focus is substantially at the radiating surface of the transducer to increase sensor gain. Further, the housing may be configured with a head which supports the transducer such that it projects acoustic energy essentially parallel with a major longitudinal dimension of the sensor housing to reduce housing size.

DESCRIPTION OF THE PREFERRED EMBODIMENTS

Figure 1:
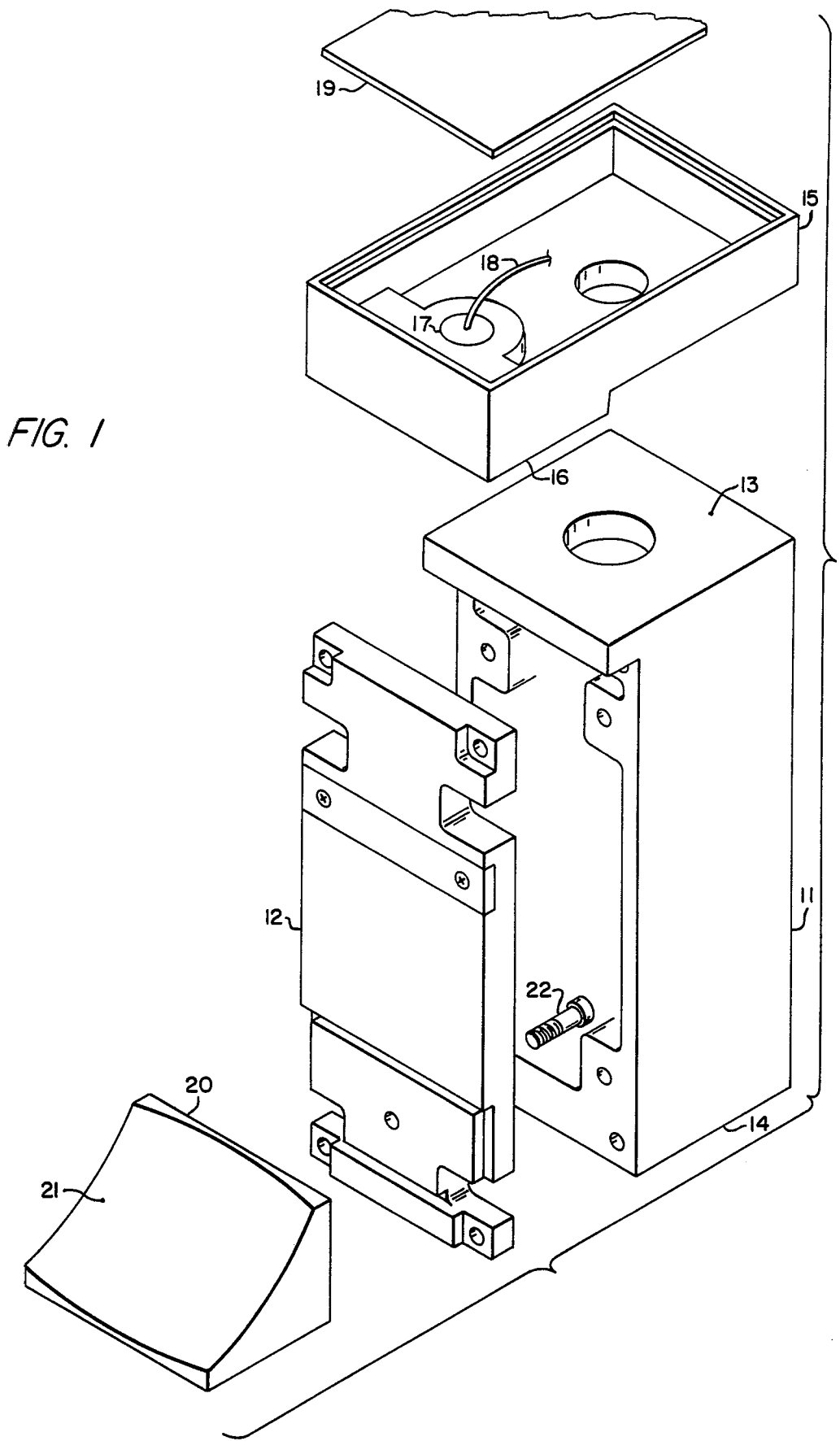
FIG. 1 is an exploded pictorial view of an ultrasonic sensor in accordance with the present invention.

In the pictorial view of FIG. 1, reference 11 identifies the main body part of an ultrasonic distance sensor in accordance with the applicant's invention. Body part 11 cooperates with a cover 12 to form a compartment for electroacoustic drive and signal processing circuitry. The body has first and second ends 13 and 14 respectively which are perpendicular to a major longitudinal dimension of the housing. Cover 12 defines a major face which intersects the first and second ends of the body.

The sensor housing also includes a head 15 which is mounted on first end 13 of the body. Head 15 includes a projecting portion 16 which extends beyond the edge of end 13 at its intersection with the major face. An electroacoustic transducer 17 is mounted in projecting portion 16, and is directed to emit and receive acoustic energy in a direction substantially parallel with the major face and longitudinal dimension of the housing body. Reference 18 identifies an electrical cable which connects transducer 17 to the electronic circuitry within the housing body. A compartment within head 15 is closed by means of a cover 19.

Figure 2:
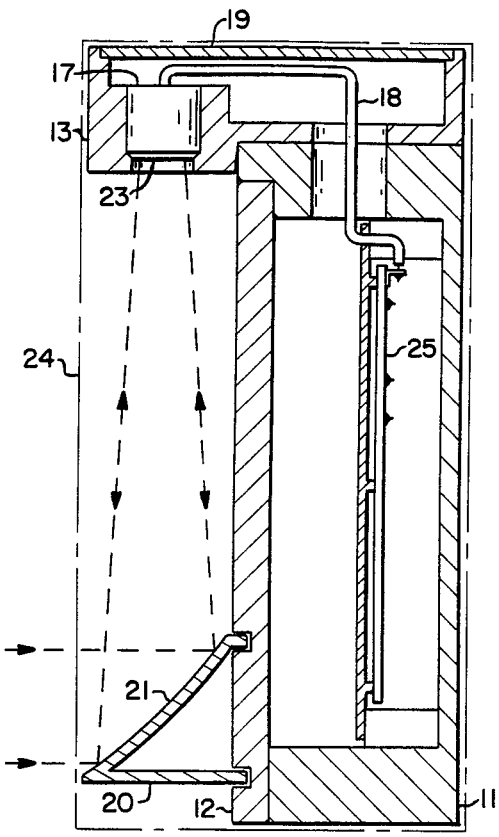
FIG. 2 is a sectional side view of the sensor of FIG. 1 equipped with a reflecting surface configured as a parabolic section.

A reflector 20 having a reflecting surface 21 thereon is mounted on cover 12 near body end 14 by means of a screw 22. Reflector 20 is in a position to redirect at least a portion of the acoustic energy emitted by transducer 17, and to direct acoustic energy impinging on surface 21 from a remote target toward the transducer. As shown in FIGS. 1 and 2, surface 21 is a section of a parabaloid having its focus at a radiating surface 23 of transducer 17.

In FIG. 2, reference 25 identifies a printed circuit board carrying the electronic drive and signal processing circuitry for transducer 17. Such circuitry preferably includes a programmed microprocessor which is responsible for timing the bursts of acoustic energy emitted by transducer 17 and processing the reflections of the bursts of acoustic energy received by transducer 17 to determine distance between the sensor housing and a target identified by reference numeral 26. The sensor housing, oomprising body part 11, head 13 and reflector 21 defines a housing envelope 24. Housing envelope 24 conforms more or less to the outer configuration of the sensor housing. However, the significant feature is that the housing is configured so that intended targets do not come within the housing envelope.

After being electrically driven to emit a burst of acoustic energy, transducer 17 unavoidably mechanically resonates or rings for a known time interval. During the known time interval acoustic energy received by the transducer is contaminated by the ringing of the transducer and cannot be processed to reliably determine target range. Also during the known time interval, an acoustic signal will travel a known distance. The sensor housing and transducer mounting arrangement are configured so that acoustic energy emitted by transducer 17 travels a distance at least half as great as the known distance before leaving transducer envelope 24. A similar time interval is required for any return reflection to traverse the distance between where it enters the housing envelope and the transducer. This permits target range to be reliably sensed for distances down to zero distance between the sensor housing and the target.

As shown in FIG. 2, parabolic reflecting surface 21 serves to focus incoming acoustic energy onto face 23 of transducer 17, thus maximizing the gain of the sensor. Maximum gain is desirable in certain applications. However, it is achieved at the expense of a narrowed field of view. If a particular sensor application requires a wider field of view, reflector 20 may be configured with a non-parabolic reflecting surface.

Figure 3:
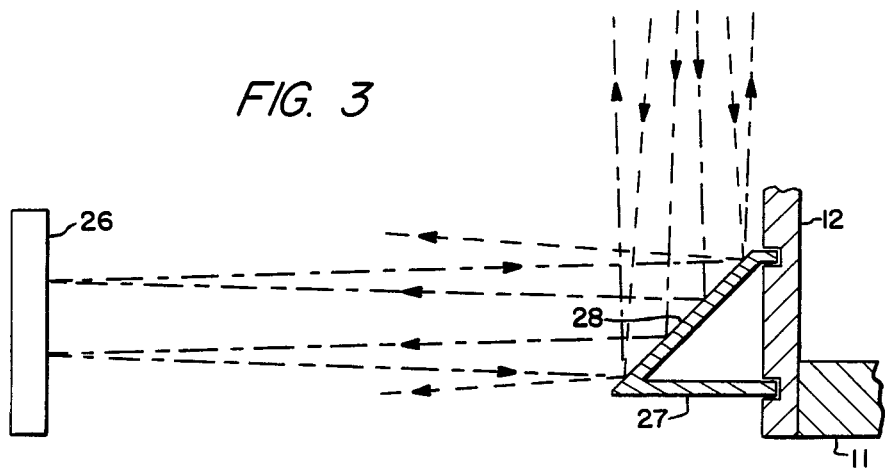
FIG. 3 is a partial sectional side view of a sensor housing in accordance with the present invention equipped with a planar reflecting surface.

FIG. 3 illustrates a sensor with a reflector 27 having a planar reflecting surface 28. With such a reflecting surface, acoustic energy impinging thereon from transducer 17 is dispersed somewhat as it leaves the reflecting surface to achieve a wider field of view. Similarly, reflections of acoustic energy from target 26 which are intercepted by surface 27 are only partially reflected to transducer 17. In any event, the particular configuration of the reflecting surface is determined by the requirements of the application in which the sensor is used. As shown, the reflector is easily changed so as to permit the basic sensor to be used in a wide variety of applications.

In accordance with the foregoing description, the applicant has provided a unique, compactly arranged ultrasonic distance sensor housing and mounting arrangement which permits a single transducer pulse transmission sensor to be used throughout a range of distances down to zero distance from the housing envelope. Although particular embodiments of the sensor are shown and described for illustrative purposes, other configurations according to the applicant's teachings will be apparent to those skilled in the relevant arts. It is not intended that coverage be limited to the disclosed embodiments, but only by the terms of the following claims.

The embodiments of the invention in which an exclusive property or right is claimed are defined as follows:

1. An ultrasonic distance sensor comprising: an electroacoustic transducer adapted to alternately emit a burst of acoustic energy in response to a corresponding electrical drive signal and convert the portion of the burst of acoustic energy reflected back from a remote target to a corresponding electrical signal, said transducer being subject to unavoidable ringing for a known time interval after each emission of a burst of acoustic energy;

electronic circuitry operable to supply the electrical drive signal to said electroacoustic transducer and to receive therefrom the electrical signal corresponding to the reflected acoustic energy; and a housing defining a housing envelope, said housing having an elongated body with first and second ends and a major face intersecting the first and second ends, a head mounted on the first end of said body with a portion extending transversely to the major face and outwardly from the intersection thereof with the first end, and a reflector mounted on the major face, the body having a compartment therein enclosing said electronic circuitry, the head supporting the transducer so that it is positioned to emit and receive acoustic energy in a direction toward the reflector, and the reflector being spaced from said transducer a distance at least half as great as that which acoustic energy travels during the known time interval.

2. The ultrasonic sensor of claim 1 wherein the reflector is positioned to intercept at least a portion of the acoustic energy emitted by said electroacoustic transducer and to reflect the intercepted energy out of the housing envelope.

3. The ultrasonic sensor of claim 2 wherein said reflector is spaced from said electroacoustic transducer by a distance substantially equal to half the distance traversed by acoustic energy during the known time interval.

4. The ultrasonic sensor of claim 3 wherein said reflector is positioned to reflect the intercepted energy in a direction which is substantially perpendicular to the direction in which acoustic energy is emitted by said electroacoustic transducer.

5. The ultrasonic sensor of claim 4 wherein said housing includes:
- a body having first and second ends and a major dimension transverse to the first and second ends; and
- a head mounted on the first end of said body, said head having a portion which extends substantially parallel with the first end of said body beyond the edge thereof, said head supporting said electroacoustic transducer in a position so that the path of acoustic energy emitted by said transducer is substantially parallel with the major dimension of said body, said reflector being located on said body near the second end thereof and positioned to reflect acoustic energy from said transducer in a direction transverse to the major dimension of said body.

6. The electroacoustic transducer of claim 4 wherein said reflector is detachably mounted on said body.

7. The ultrasonic sensor of claim 6 wherein said reflector has a planar reflecting surface thereon.

8. The ultrasonic sensor of claim 6 wherein said reflector has a nonplanar reflecting surface thereon.

9. The ultrasonic sensor of claim 8 wherein the reflecting surface on said reflector defines a parabolic section whose focus is substantially at a radiating surface of said electroacoustic transducer, whereby the gain of the ultrasonic sensor is increased.

10. A single transducer ultrasonic distance sensor comprising:
- a housing body having first and second ends and a major face extending between the first and second ends, said housing body having a compartment therein;
- a head on the first end of said housing body, said head having a projecting portion which extends beyond the edge of the first end of said housing body at its intersection with the major face;
- an electroacoustic transducer mounted in the projecting portion of said head and positioned to transmit and receive acoustic energy in a direction substantially parallel with the major face of said housing body;
- transmit/receive circuitry within the compartment in said housing body and connected to said electroacoustic transducer, said transmit/receive circuitry being adapted to alternately cause said electroacoustic transducer to transmit a burst of acoustic energy and receive electrical signals resulting from receipt by said electroacoustic transducer of reflections of the burst of acoustic energy from a remote target, said transducer being subject to unavoidable ringing for a known time interval after each transmission of a burst of acoustic energy, whereby the range of a target within a known distance from said electroacoustic transducer corresponding to one half of the known time interval cannot be reliably determined; and
- a reflector on said housing body near the second end thereof at a distance from the radiating surface on said electroacoustic transducer at least as great as one half of the distance travelled by acoustic energy during the known time interval, said housing body, said head and said reflector defining a housing envelope, said reflector being positioned to intercept at least a portion of the acoustic energy transmitted by said electroacoustic transducer and to reflect the intercepted energy out of the housing envelope.

11. The ultrasonic distance sensor of claim 10 wherein said reflector has a planar reflecting surface thereon.

12. The ultrasonic distance sensor of claim 10 wherein said reflector has nonplanar reflecting surface thereon.

13. The ultrasonic distance sensor of claim 12 wherein the reflecting surface on said reflector is a parabolic section whose focus is at the radiating surface of said electroacoustic transducer, whereby the gain of the ultrasonic sensor is increased.

14. The ultrasonic distance sensor of claim 10 wherein said reflector is detachably mounted on said housing body.

* * * * *